United States Patent [19]

Merrill

[11] Patent Number: 4,603,874
[45] Date of Patent: Aug. 5, 1986

[54] HITCH-BORNE VEHICLE TRANSPORT

[76] Inventor: Darrell L. Merrill, 18428 N. 32 Dr., Phoenix, Ariz. 85023

[21] Appl. No.: 755,852

[22] Filed: Jul. 17, 1985

[51] Int. Cl.$^4$ .............................................. B60R 9/10
[52] U.S. Cl. ................................................... 280/402
[58] Field of Search ............... 280/402, 47.15, 491 R, 280/491 A, 491 E; 414/563

[56] References Cited

U.S. PATENT DOCUMENTS 2,773,696  12/1956  George ........................... 280/402 X
3,740,074   6/1973  Coil ..................................... 280/402
3,912,098  10/1975  Nicotra ........................... 280/402 X

FOREIGN PATENT DOCUMENTS 793834  1/1981  U.S.S.R. ............................. 280/402

OTHER PUBLICATIONS

Pages 16, 17, J. C. Whitney Catalog No. 458E, publ. 1985, by J. C. Whitney Co. (Warshawsky Co.) 1917-19, Archer Av., Chicago, IL 60680.

Primary Examiner—John A. Pekar
Attorney, Agent, or Firm—Robert A. Hirschfeld

[57] ABSTRACT

A hitch-borne vehicle transport releasably bears the entire weight of a vehicle having at least one pair of coaxial wheels separated by an axle, upon a box-end trailer hitch receiver. The axle is engaged and captured while the vehicle is on the ground by clevises coupled to a transverse bar parallel the axle and pivotingly borne through a cantilever by the box-end trailer hitch. The part of the vehicle adjacent the axle is hoisted off the ground to an elevated position. The vehicle is then pivoted about the axle to an upright position, where it is retained by engagement of the vehicle's graspable body member into a cantilever-mounted clevis. Thus held, the vehicle's entire weight is transmitted through its axle and graspable body member to the box-end trailer hitch for safe, convenient transport or storage.

19 Claims, 7 Drawing Figures

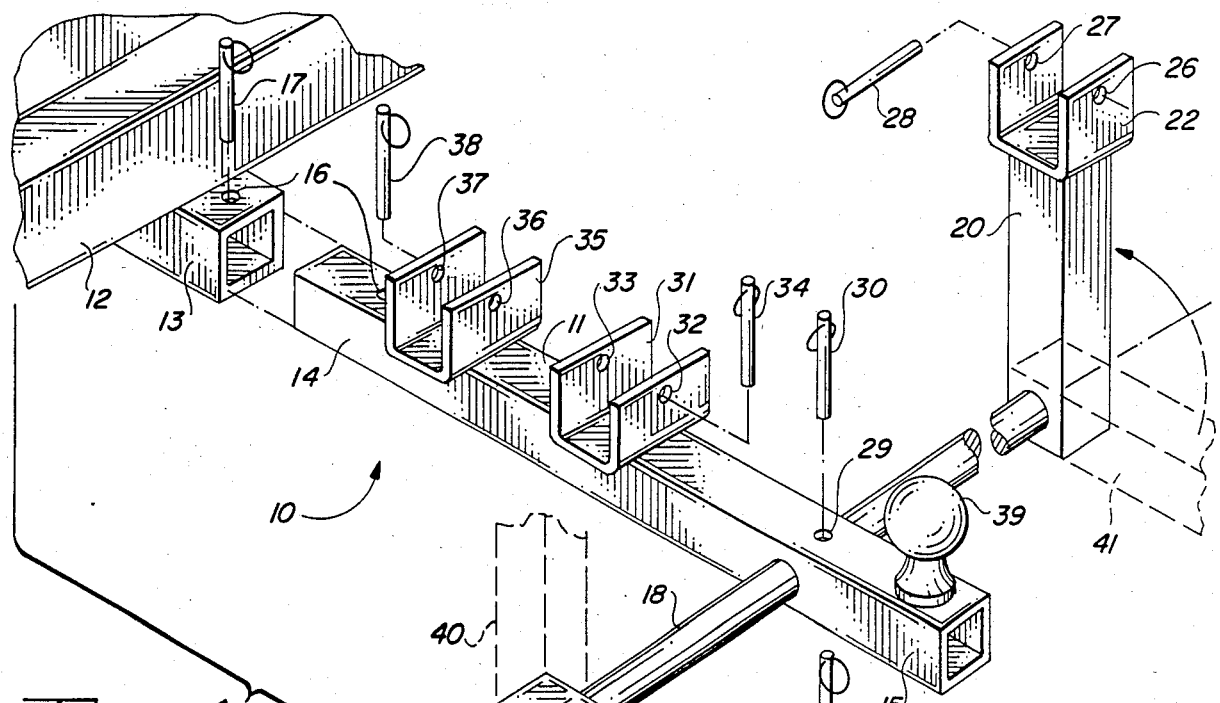
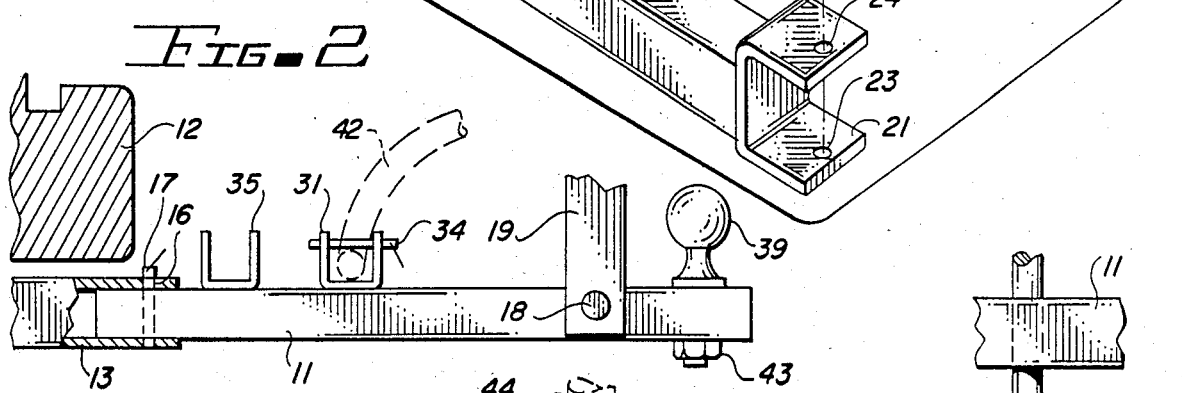
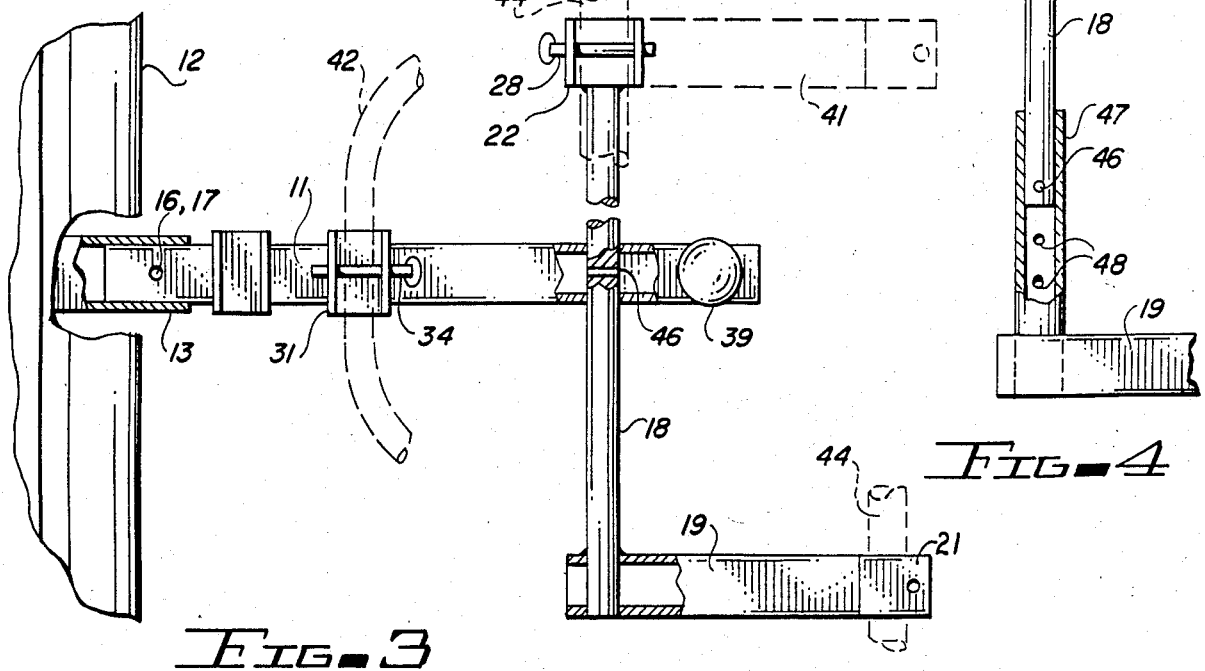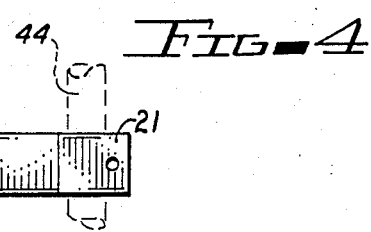

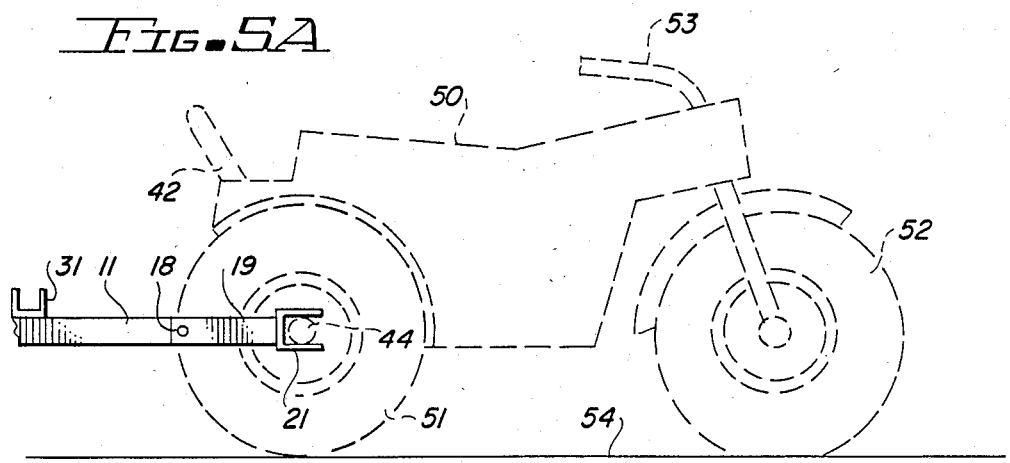
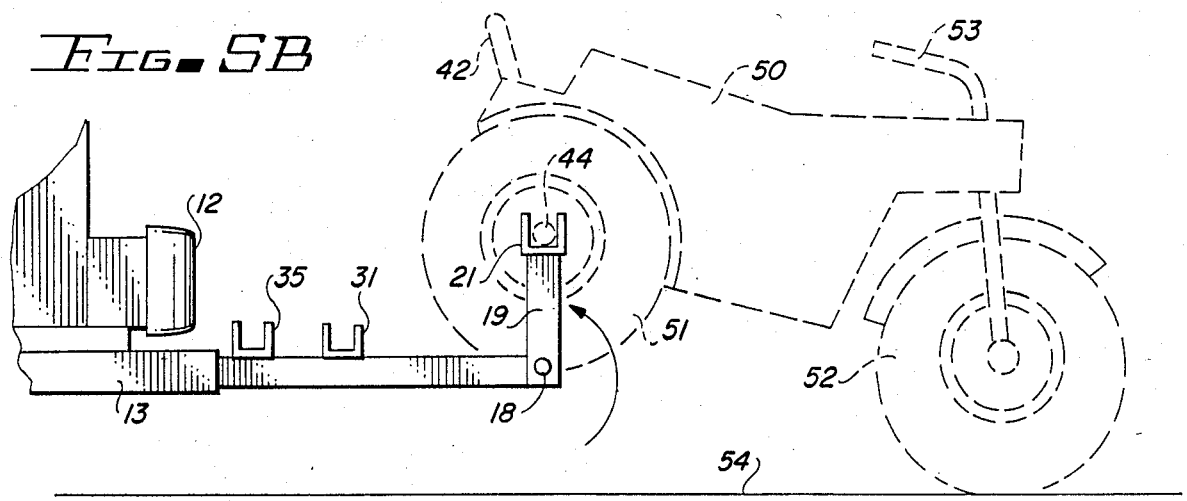
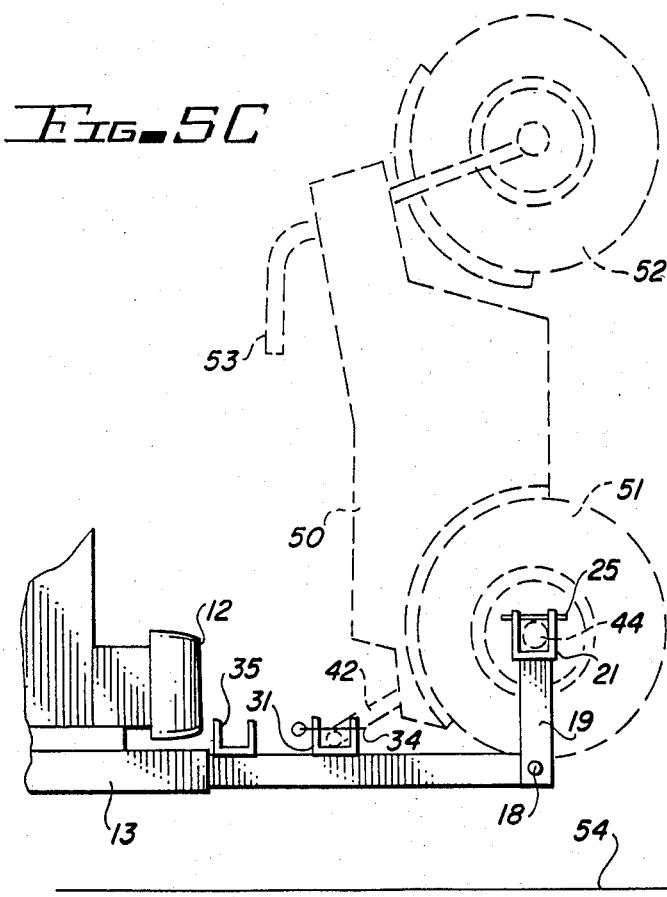

HITCH-BORNE VEHICLE TRANSPORT

TECHNICAL FIELD

The invention relates to transports for vehicles having at least one pair of coaxial wheels separated by an axle, such as the three-wheeled all-terrain-vehicle.

The invention relates more particularly to a transport for bearing the entire weight of a vehicle having at least one pair of coaxial wheels separated by an axle, upon a box-end trailer hitch receiver.

PRIOR ART

Small vehicles having at least one axle common to a pair of wheels are widely used for local transportation, door-to-door residential service, and recreation. These vehicles are exemplified by the three-wheeled, large tired "all terrain vehicle" or ATV used for recreational off-road applications, three or four-wheeled golf carts, postal delivery vehicles, residential utility meter-reader vehicles, and the like. It is common for such small vehicles to be unsuitable or unlicensed for on-road use, and therefore they are often borne over long distances on highways within or upon truck beds, or towed, trailer fashion to the site where they are to be used.

Some jurisdictions have regulations prohibiting the towing of tandem vehicles by certain classes of towing vehicles such as passenger automobiles or pickup trucks; yet there are pleasure and business applications wherein it is desirable to simultaneously transport a small off-road vehicle and to tow a trailer.

It has long been known in the art to couple a transport for a narrow two-wheel vehicle such as a bicycle or motorcycle, wherein the two wheels do not share a common axle and are not coaxial, to the front or rear bumper of a passenger car or truck, or to coupling means supported more solidly by the undercarriage of the tranporting vehicle. In the case of lightweight bicycles, such prior-art carriage is achieved by manually lifting the bicycle onto the transport means. Heavier two-wheel motorcycles have in the past been placed upon such transport means via ramps; owing to the narrow side profile of such two-wheeled vehicles, they are generally borne in a direction pointing ninety degrees to the right or left of the direction of travel of the transportin9 vehicle, more or less flat against its front or rear.

A more bulky three- or four-wheel small vehicle cannot as conveniently be carried by means comparable to those used for two-wheel bicycles and motorcycles. Because at least two wheels are separated coaxially by an axle, ramp emplacement is less practical than for the narrower two-wheel vehicles, when it is desired to wholly bear the weight of the three- or four-wheel vehicle other than in the bed of a truck. Furthermore, it is impractical for one person to lift or hoist the entire weight in a single step of such a heavier, bulkier vehicle from the ground to a position wholly supported by a transport structure.

The use of the box-end trailer hitch receiver is common upon passenger cars and light trucks. In ordinary towing use, the box-end trailer hitch is releasably coupled either to the tongue of a trailer, inserted socket-fashion therein and retained by a pin therethrough, or an adaptor is comparably inserted and retained in the box-end trailer hitch, the adaptor having a ball-type hitch suitable for coupling with a ball-type trailer tongue.

In usual classes of usage, the box-end trailer hitch is weldingly or screw-fastened to the undercarriage of the towing vehicle, and is rated to bear a vertical weight load of several hundred pounds, and to pull in tension trailers weighing several thousand pounds.

It is therefore an object to provide a hitch-borne vehicle transport capable of safely bearing the entire weight of a vehicle having at least one pair of coaxial wheels separated by an axle, upon a box-end trailer hitch.

A further object is to provide a hitch-borne vehicle transport which grasps the borne vehicle at coupling loci already existing upon the borne vehicle.

Another object is to provide a hitch-borne vehicle transport which carries the borne vehicle on end, for compactness.

A still further object is to provide a hitch-borne vehicle transport capable of coupling to the borne vehicle while the borne vehicle rests upon the ground, and in which the hoisting of the borne vehicle comprises a first weight-lifting step requiring only moderate effort, and a second step of pivoting the already hoisted borne vehicle into compact upright transport position.

Yet another object is to provide a hitch-borne vehicle transport adaptable to borne vehicles of varying dimensions.

Still another object is to provide a hitch-borne vehicle transport which, while supported by a box-end trailer hitch, permits another vehicle to be towed by the same hitch.

A further object is to provide a hitch-borne vehicle transport capable of mounting releasably upon a fixed wall or support, for storage in upright compact condition of the borne vehicle.

Another object of the invention is to provide a hitch-borne vehicle transport capable of rapid capture and emplacement, as well as rapid release and deployment, of the borne vehicle.

DISCLOSURE OF THE INVENTION

A cantilever is inserted at an anterior end into a conventional box-end trailer hitch and there captured. A transverse bar pivots at the posterior end of the cantilever, the transverse bar being perpendicular to the cantilever and approximately parallel to the ground. From each end of the transverse bar, a hoist bar protrudes toward the axle to be grasped of the borne vehicle, wheels of which rest initially upon the ground, which axle is captured and grasped by clevises at the extremities of the respective hoist bars. The vehicle is manually grasped, and with a moderate force urged upward adjacent the grasped axle until the hoist bars are approximately upright, and the corresponding wheels are off the ground, whereupon the freely pivoting transverse bar is locked into a condition maintaining the upright position of the hoist bars at its ends.

Now that the axle and corresponding wheels of the borne vehicle have been hoisted above ground, the entire borne vehicle is pivoted about the captured axle into an upright position, and a graspable member of the borne vehicle's body is captured by a clevis attached to the cantilever, such that the borne vehicle is retained in upright position, and its entire weight is transmitted through its captured axle and its graspable body member, and then through the cantilever, to the box-end trailer hitch. In this condition, the entire structure may be safely moved at up to highway speeds on public roads.

In one embodiment, a ball-type trailer hitch is coupled to the posterior end of the cantilever, so that a conventional ball-type trailer tongue towing a conventional trailer may be attached after the borne vehicle has been emplaced. Thus, the borne vehicle, with its wheels entirely off the ground during transport, does not comprise a tandem towing statute violation when the conventional trailer is also towed.

In another embodiment, clevises are provided at several loci along the cantilever to capture grapable body members of a variety of borne vehicle sizes and types.

In still another embodiment, a selectably pinned collar couples the hoist bars to the transverse bar, allowing lateral spacing adjustment between the hoist bars to accommodate borne vehicles of various sizes and wheel spacings.

BRIEF DESCRIPTION OF THE DRAWINGS

FIG. 1 is a perspective view of the invention in spaced relationship to a box-end trailer hitch. The nearer hoist bar is shown in position to receive a vehicle axle while the vehicle is on the ground. The more distant hoist bar is shown in upright position. It should be understood that in actual configuration, the hoist bars are parallel.

FIG. 2 is a side elevation view of FIG. 1 with hoist bars upright, showing in phantom the capture of a graspable body member of the borne vehicle.

FIG. 3 is a top view of the view of FIG.1,

FIG. 4 is a partial cutaway view of an embodiment of the transverse bar and hoist bar showing adjustability of coupling locus.

FIG. 5A is a side elevation view showing the borne vehicle in phantom, in first condition when the borne vehicle rests upon the ground.

FIG. 5B is a view similar to FIG. 5A showing the borne vehicle hoisted into second condition upon the upright hoist bar.

FIG. 5C is a view similar to FIG. 5A showing the borne vehicle pivoted upon its axle to a third, upright condition with graspable body member captured, for transport or storage.

BEST MODE FOR CARRYING OUT THE INVENTION

For the purposes of promoting an understanding of the principles of the invention, reference will now be made to the embodiments illustrated in the drawings. Specific language will be used to describe the same. It will, nevertheless, be understood that no limitation of the scope of the invention is thereby intended, such alterations and further modifications in the illustrated device; and such further applications of the principles of the invention as illustrated herein being contemplated as would normally occur to one skilled in the art to which the invention relates.

In FIG. 1, the invention is generally referred to as number 10. Cantilever 11 is shown preparatory to insertion at anterior end 14 into box-end hitch receiver 13, which is in turn affixed to the undercarriage of transport vehicle 12, also referred to as towing vehicle 12 and alternatively as fixed wall 12. When so inserted, cantilever 11 is retained within box-end hitch receiver 13 by hitch pin 17 through cooperating hitch pin holes 16 in cantilever 11 and box-end hitch receiver 13.

Transverse bar 18 is pivotingly supported by cantilever 11 adjacent posterior end 15 of cantilever 11, at a pivot surface (not separately indicated) of transverse bar 18 intermediate junction ends (not separately indicated) of transverse bar 18. Attached respectively at a first junction end (the nearer end in FIG. 1) and a second junction end (the more distant end in FIG. 1) are hoist bars 19 (40) and 20 (41). It should be understood that FIG. 1 does not show said hoist bars in their actual relative positions, which are parallel. For illustration purposes, 19 shows the first hoist bar in first position ready for coupling with the borne vehicle (illustrated in FIGS. 5A), in which position the corresponding hoist bar is in the position illustrated in phantom by 41. Second hoist bar 20 is shown in second, upright position (illustrated in FIGS. 5B, 5C), corresponding to a first hoist bar position illustrated in phantom by 40.

First clevis 21 is affixed at the clevis end (not separately indicated) of hoist bar 19 (40) transverse junction end (not separately indicated) of hoist bar 19(40). First clevis 21 is a U-shaped member capable of capturing therein axle 44 (illustrated in subsequent figures) when clevis pin 25 is passed through cooperating clevis pin holes 23,24.

In like manner, second clevis 22 is affixed at the clevis end (not separately indicated) of hoist bar 20(41) transverse junction end (not separately indicated) of hoist bar 20(41). Second clevis 22 is a U-shaped member capable of capturing therein axle 44 (illustrated in subsequent figures) when clevis pin 28 is passed through cooperating clevis pin holes 26,27.

Third clevis 31 is affixed to cantilever 11 intermediate anterior end 14 and posterior end 15, in a location suitable for capturing a graspable body member 42 (illustrated in subsequent figures) of borne vehicle 50 (illustrated in subsequent figures) by passage of capture pin 34 through cooperating capture pin holes 32,33.

In like manner, an alternative fourth clevis 35 is affixed to cantilever 11 in a locus suitable for capturing a graspable body member 42 (illustrated in subsequent figures) of a borne vehicle 50 different in size from that for which third clevis 31 is located, by passage of capture pin 38 through cooperating capture pin holes 36,37.

Ball-type trailer hitch 39 is affixed to cantilever 11 adjacent posterior end 15 for coupling to a towed vehicle (not shown) simultaneously with bearing of the borne vehicle 50.

FIG. 2, a side view, more clearly illustrates how the elements of FIG. 1 are in use coupled, showing in phantom graspable body member 42 captured within clevis 31.

In FIG. 3, a top view, axle 44 is shown captured in clevis 22 in upright, second position in the upper portion of FIG. 3. In the lower portion, Hoist bar 19 is shown in first position with axle 44 inserted into clevis 21 prior to capture. Although axle 44 is shown, for illustration purposes only, in two different loci in FIG. 3, it should be understood that in actuality the portions of axle 44 are coaxial.

In FIGS. 1 and 3, the position of anti-pivot pin 30, and of cooperating anti-pivot pin hole 29 in cantilever 11 and anti-pivot pin hole 46 in transverse bar 18 are shown. Hole 46 is parallel the direction of hoist bar 19, such that when hoist bars 19,41 are elevated to upright positions 20,40, hole 46 is aligned with hole 29. In said upright position, therefore, anti-pivot pin 30 may be passed through said holes 29,46 to retain the said hoist bars, coupled rigidly by transverse bar 18, in upright position shown in FIGS. 5B, 5C.

FIG. 4 illustrates an alternative coupling embodiment between hoist bar 19 and transverse bar 18, wherein sliding collar 47 circumscribes transverse bar 18, and adjustment cooperating holes 48 in collar 47 and 46 in transverse bar 18 may be selectedly aligned and penetrated by a pin (not shown) to maintain one of a plurality of adjustable positional relationships between hoist bar 19 and transverse bar 18. As a further alternative embodiment, transverse bar 18, instead of pivoting within cantilever 11 as in the previously described embodiment and being rigidly affixed to the hoist bars 19,20 is instead rigidly affixed to cantilever 11, with the anti-pivoting function previously described for pin 30 and holes 29,46 instead being performed by a corresponsing pin (not shown), holes 46,48, and corresponding holes (not shown) for hoist bar 20.

The actual use of the invention is more clearly shown in FIGS. 5A,B and C. In FIG. 5A, hoist bar 19 (and corresponding hoist bar 20, not shown for clarity) are freely pivoted to a height wherein axle 44 of vehicle 50 with wheels 51,52 resting upon ground surface 54 may be backed into or engaged with clevis 21 (and clevis 22, not shown). The borne vehicle 50 shown in FIGS. 5A,B and C is illustrated as a 3-wheel recreational all-terrain-vehicle (ATV) having handlebars 53, front wheel 52, and rear grab-handle 42, which performs as illustrated as the graspable body member 42, ordinarily used to manually lift the rear portion of vehicle 50. In convention ATV's 50, grab handle 42 is a u-shaped handle member. After axle 44 is engaged in clevises 21,22, it is retained by pins 25,28 respectively through holes 23,24,26,27 (not shown in FIGS. 5A,B for clarity).

In FIG. 5B, the vehicle 50 has been grasped manually at handle 42, and force applied manually to liftingly and pivotingly urge axle 44, wheels 51, clevises 21,22 and hoist bars 19,41 into upright position 20,40, whereupon pin 30 is inserted through holes 29,46 (not shown for clarity) to retain the upright position illustrated in FIGS. 5B, 5C. In the second condition illustrated by FIG. 5B, wheel 52 remains upon the ground, partially supporting the weight of vehicle 50.

In FIG. 5C, manual force has been applied to the body of vehicle 50 to pivot said body 50 into an upright position. Grab handle 42, also defined as graspable body member 42, is retained in clevis 31 by pin 34. Thus, in FIG. 5C, the entire body weight of vehicle 50 is transmitted respectively through axle 44 and grab handle 42 through the respective illustrated intervening members to box-end trailer hitch receiver 13. The vehicle may as shown in FIG. 5C be safely and efficiently transported or stored. In an alternate embodiment, 12 refers to a fixed wall rather than to a towing vehicle 12. In fixed-wall use, the vehicle may be safely stored on the wall of a garage or the like.

Although not specifically illustrated, the present invention also contemplates the substitution of padlocks for each of the illustrated pins, for locking the invention to the towing vehicle or support wall, and for locking the borne vehicle therethrough for anti-theft purposes.

Those skilled in the art will readily derive other embodiments of the invention drawn from the teachings herein. To the extent that such alternative embodiments are so drawn, it is intended that they shall fall within the ambit of protection provided by the claims appended hereto.

Having described my invention in the foregoing specification and the accompanying drawings in such a clear and concise manner that those skilled in the art may readily understand and easily practice the invention, I claim:

1. A hitch-borne vehicle transport for releasably bearing the entire weight of a vehicle upon a box-end trailer hitch receiver, said vehicle having at least one pair of coaxial wheels separated by an axle, said vehicle having a graspable body member in spaced relationship to said axle, said hitch-borne vehicle transport comprising:

cantilever means for supporting said vehicle in spaced relationship to said box-end trailer hitch receiver, said cantilever means having an anterior end and a posterior end, said anterior end releasably capturable within said box-end trailer hitch receiver;

a transverse bar having a first end, a second end and a pivot surface intermediate said first and second ends, said transverse bar pivotingly supported adjacent said pivot surface by said cantilever means adjacent said posterior end, said transverse bar orthogonal said cantilever means, said transverse bar substantially parallel said axle;

a first hoist bar having a clevis end a first junction end, said first hoist bar attached at said first junction end to said first end of said transverse bar, said first hoist bar rotatable about said first junction in a plane parallel said cantilever means;

a second hoist bar having a clevis end and a second junction end, said second hoist bar attached at said second junction end to said second end of said transverse bar, said second hoist bar rotatable about said second junction end in a plane parallel said cantilever means, said second hoist bar parallel said first hoist bar;

first clevis means attached at said clevis end of said first hoist bar for releasably capturing said axle adjacent a first of said pair of coaxial wheels of said vehicle;

second clevis means attached at said clevis end of said second hoist bar for releasably capturing said axle adjacent a second of said pair of coaxial wheels of said vehicle;

means adjacent said pivot surface for selectedly resisting pivoting of said transverse bar with respect to said cantilever means; and third clevis means attached to said cantilever means intermediate said anterior and posterior ends for releasably capturing said graspable body member of said vehicle.

2. The hitch-borne vehicle transport of claim 1 wherein said box-end trailer hitch receiver is mounted in conventional towing position upon a towing vehicle.

3. The hitch-borne vehicle transport of claim 2 further comprising a trailer hitch ball mounted upon said cantilever means adjacent said posterior end for towing a trailer simultaneously with bearing said vehicle.

4. The hitch-borne vehicle transport of claim 1 wherein said box-end trailer hitch receiver is fixedly mounted to a wall for storage of said vehicle.

5. The hitch-borne vehicle transport of claim 1 further comprising fourth clevis means in spaced relationship to said third clevis means for releasably capturing a graspable body member of a vehicle larger than said vehicle, said fourth clevis means attached to said cantilever means.

6. The hitch-borne vehicle transport of claim 5 wherein said fourth clevis means has cooperating capture pin holes releasingly coupled by capture pin means for releasingly capturing said graspable body member of said vehicle larger than said vehicle.

7. The hitch-borne vehicle transport of claim 1 wherein said cantilever means and said box-end trailer hitch receiver have cooperating hitch pin holes releasingly coupled by a hitch pin disposed through said cantilever means and said box-end trailer hitch.

8. The hitch-borne vehicle transport of claim 1 wherein said first clevis means and said second clevis means each has cooperating clevis pin holes releasingly coupled by clevis pin means for releasingly capturing said axle within said first clevis means and within said second clevis means.

9. The hitch-borne vehicle transport of claim 1 wherein said means adjacent said pivot surface for selectedly resisting pivoting of said transverse bar with respect to said cantilever means comprises anti-pivot pin means releasingly disposed through cooperating pin holes in said transverse bar and said cantilever means, said cooperating pin holes being aligned when said first and second hoist bars are upright.

10. The hitch-borne vehicle transport of claim 1 wherein said third clevis means has cooperating capture pin holes releasingly coupled by capture pin means for releasingly capturing said graspable body member of said vehicle.

11. The hitch-borne vehicle transport of claim 1 further comprising means for selectedly adjusting the distance between said first hoist bar and said second hoist bar to accommodate vehicles having said axle of various lengths.

12. A hitch-borne vehicle transport for releasably bearing the entire weight of a vehicle upon a box-end trailer hitch receiver, said vehicle having at least one pair of coaxial wheels separated by an axle, said vehicle having a graspable body member in spaced relationship to said axle, said hitch-borne vehicle transport comprising:

cantilever means for supporting said vehicle in spaced relationship to said box-end trailer hitch receiver, said cantilever means having an anterior end and a posterior end, said anterior end releasably capturable within said box-end trailer hitch receiver; means means pivotingly coupled to said cantilever adjacent said posterior end for releasably grasping said axle adjacent each of said pair of coaxial wheels in a first condition wherein said wheels are emplaced upon a ground surface, and in a second condition wherein said wheels are raised above said ground surface;

means for releasably maintaining said means for releasably grasping said axle in said second condition; and means for releasably capturing said graspable body member of said vehicle in said second condition.

13. The hitch-borne vehicle transport of claim 12 wherein said box-end trailer hitch receiver is mounted in conventional towing position upon a towing vehicle.

14. The hitch-borne vehicle transport of claim 13 further comprising a trailer hitch ball mounted upon said cantilever means adjacent said posterior end for towing a trailer simultaneously with bearing said vehicle.

15. The hitch-borne vehicle transport of claim 12 wherein said box-end trailer hitch receiver is fixedly mounted to a wall for storage of said vehicle.

16. The hitch-borne vehicle transport of claim 12 wherein said means for releasably grasping said axle comprises first and second clevis means each having releasable clevis pin means.

17. The hitch-borne vehicle transport of claim 16 further comprising means for selectedly adjusting the distance between said first and second clevis means.

18. The hitch-borne vehicle transport of claim 12 wherein said means for releasably capturing said graspable body member comprises a plurality of clevis means affixed to said cantilever means at distances from said axle corresponding to the distance from said axle to said graspable body member of vehicles of various sizes.

19. A hitch-borne vehicle transport for releasably bearing the entire weight of a vehicle upon a box-end trailer hitch receiver, said vehicle having at least one pair of coaxial wheels separated by an axle, said vehicle having a graspable body member in spaced relationship to said axle, said hitch-borne vehicle transport comprising:

cantilever means releasably capturable within said box-end trailer hitch receiver; and means affixed to said cantilever means for releasably capturing said axle when said pair of coaxial wheels rest upon a ground surface, means affixed to said cantilever means for pivotingly hoisting said coaxial wheels above said ground surface, means affixed to said cantilever means for capturing said graspable body member, and means affixed to said cantilever means for transmitting the entire weight of said vehicle through said axle and said graspable body member to said cantilever means.

* * * * *